US012739097B2

(12) United States Patent
Friesen

(10) Patent No.: US 12,739,097 B2
(45) Date of Patent: Sep. 15, 2026

(54) METHOD FOR ENCRYPTING PLAIN TEXT

(71) Applicant: MERCEDES-BENZ GROUP AG, Stuttgart (DE)

(72) Inventor: Viktor Friesen, Karlsruhe (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/137,739

(22) PCT Filed: Nov. 26, 2023

(86) PCT No.: PCT/EP2023/083082
§ 371 (c)(1),
(2) Date: Jun. 11, 2025

(87) PCT Pub. No.: WO2024/126012
PCT Pub. Date: Jun. 20, 2024

(65) Prior Publication Data

US 2026/0019234 A1 Jan. 15, 2026

(30) Foreign Application Priority Data

Dec. 12, 2022 (DE) ..................... 10 2022 004 632.6

(51) Int. Cl.
*H04L 29/00* (2006.01)
*H04L 9/06* (2006.01)

(52) U.S. Cl.
CPC .................................. *H04L 9/0637* (2013.01)

(58) Field of Classification Search
CPC .......................... H04L 9/0637; H04L 2209/84
See application file for complete search history.

(56) References Cited

U.S. PATENT DOCUMENTS 4,322,576 A * 3/1982 Miller .................. H04L 9/0625 370/476
5,870,470 A * 2/1999 Johnson ............... H04L 9/0618 380/282

(Continued)

FOREIGN PATENT DOCUMENTS

DE 102019113026 A1 11/2019
DE 102021001095 A1 6/2021

(Continued)

OTHER PUBLICATIONS

Decision to Grant a Patent mailed Mar. 20, 2025 in related/corresponding EP Application No. 23814130.3.

(Continued)

*Primary Examiner* — Don G Zhao
(74) *Attorney, Agent, or Firm* — PATENT PORTFOLIO BUILDERS PLLC

(57) ABSTRACT

Plain text that is part of the plain text message is encrypted using a reversible decomposition function, which allocates two plain text parts to each plain text to be encrypted. These plain text parts are then encrypted with at least one encryption function in two separate steps. Since the decomposition function is reversible, the inverse function can always be used to unambiguously derive the original plain text from the plain text parts. This is now used to decrypt the cipher text message created by the encryption with the cipher text parts using a suitable decryption. The cipher text parts are decrypted one after the other using at least one decryption function to then recover the plain text. A conventional initialization vector for encryption and decryption is then replaced by selected or all bits of the second plain text part or a bit sequence derived from this.

14 Claims, 1 Drawing Sheet

(56) References Cited

Figure 1:
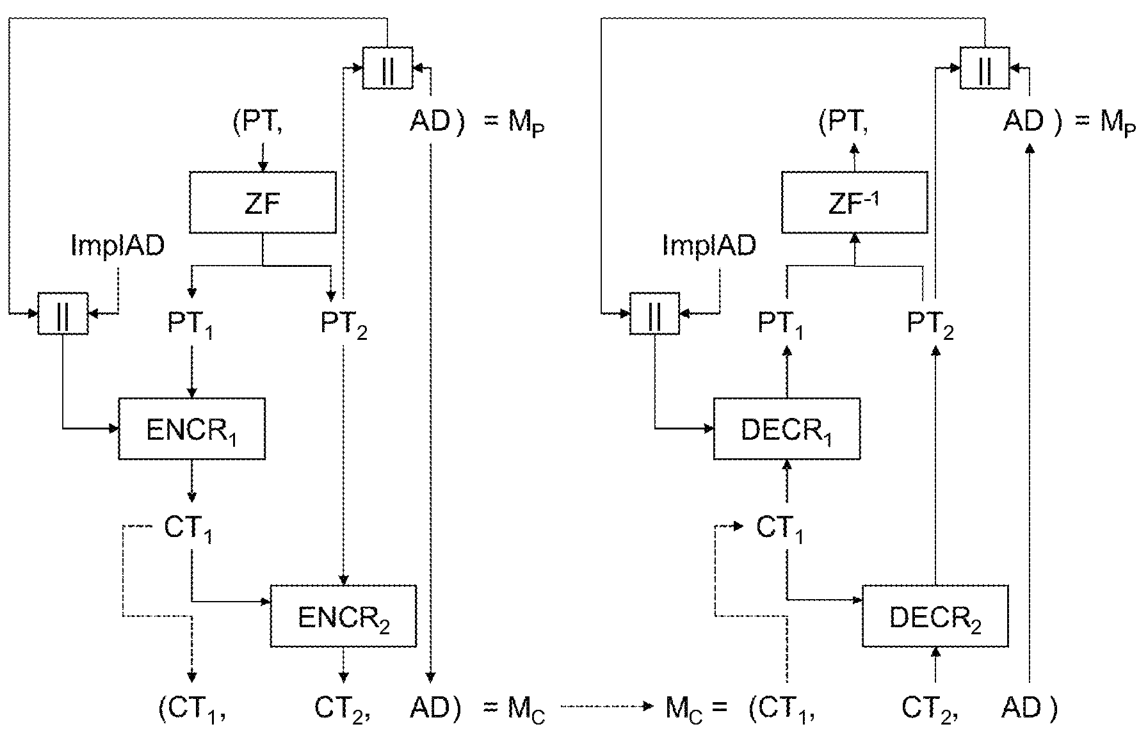

U.S. PATENT DOCUMENTS 7,945,783 B2 * 5/2011 Kent, Jr. .............. G06Q 10/107 713/168
8,223,967 B2 * 7/2012 Bennett .............. H04N 21/6334 725/100
8,316,237 B1 * 11/2012 Felsher .............. H04L 63/061 380/282
8,356,177 B2 * 1/2013 McGrew .............. H04L 9/3242 713/168
8,358,781 B2 * 1/2013 Schneider .............. H04L 9/0637 380/46
9,602,277 B2 * 3/2017 Marlow .............. H04W 12/033
10,097,522 B2 * 10/2018 Philipp .............. H04L 9/0894
10,728,019 B2 * 7/2020 Winslow .............. H04L 9/0637
11,294,727 B2 * 4/2022 Ragnoli .............. H04L 9/0637
11,336,447 B2 * 5/2022 Samid .............. H04L 63/0471
11,347,895 B2 * 5/2022 Abhyankar .............. G06F 21/72
11,451,521 B2 * 9/2022 Rangaraj .............. H04L 63/0435
11,539,505 B2 * 12/2022 Onoda .............. H04L 9/0637
11,546,146 B2 * 1/2023 Kalach .............. H04L 9/0861
11,580,234 B2 * 2/2023 Kounavis .............. G06F 21/602
11,810,676 B2 * 11/2023 Brock .............. G06N 20/00
11,824,840 B1 * 11/2023 Meixler .............. H04L 9/0643
12,160,501 B2 * 12/2024 Webster .............. H04L 9/3242
12,341,871 B2 * 6/2025 Stapleton .............. H04L 9/14
2003/0084308 A1 * 5/2003 Van Rijnswou .............. H04L 9/0618 713/189
2005/0008162 A1 * 1/2005 Brokenshire .............. H04L 9/0618 380/277
2005/0210179 A1 * 9/2005 Walmsley .............. G06F 21/445 711/3
2005/0213752 A1 * 9/2005 Hawkes .............. H04L 9/065 380/28
2005/0262573 A1 * 11/2005 Bo .............. H04N 21/25816 348/E7.071
2006/0100964 A1 * 5/2006 Wilde .............. G06Q 30/0283 705/57
2008/0288771 A1 * 11/2008 Kulakowski .............. H04L 9/16 713/150
2010/0002870 A1 * 1/2010 Rose .............. H04L 9/3236 380/28
2010/0135486 A1 * 6/2010 Schneider .............. H04L 9/0637 380/46
2010/0169645 A1 * 7/2010 McGrew .............. H04L 9/0637 380/268
2011/0054767 A1 * 3/2011 Schafer .............. G08G 1/0112 701/119
2011/0194693 A1 * 8/2011 Izu .............. H04L 9/0637 380/255
2012/0314857 A1 * 12/2012 Minematsu .............. H04L 9/0618 380/44
2013/0305328 A1 * 11/2013 Leung .............. H04L 63/083 726/6
2016/0226660 A1 * 8/2016 Takatsukasa .............. H04L 9/0631
2016/0344707 A1 * 11/2016 Philipp .............. H04L 63/06
2017/0170952 A1 * 6/2017 Hart .............. H04L 9/0618
2018/0285838 A1 * 10/2018 Franaszek .............. H04L 9/3236
2018/0359222 A1 * 12/2018 Hathaway .............. H04L 67/34
2019/0251526 A1 * 8/2019 Jackson .............. G06Q 20/06
2019/0305936 A1 * 10/2019 King .............. H04L 9/3236
2019/0377904 A1 * 12/2019 Sinha .............. H04L 9/3239
2020/0052884 A1 * 2/2020 Tong .............. H04L 9/3297
2020/0084021 A1 * 3/2020 Kim .............. H04L 9/0819
2020/0084027 A1 * 3/2020 Duchon .............. G06F 21/602
2020/0117810 A1 * 4/2020 Kounavis .............. G06F 21/602
2020/0127982 A1 * 4/2020 Rangaraj .............. H04L 63/0435
2020/0250318 A1 * 8/2020 Al Belooshi .............. H04L 9/0662
2020/0313856 A1 * 10/2020 Basu .............. H04L 9/3073
2021/0092102 A1 * 3/2021 Hathaway .............. H04L 63/168
2021/0281407 A1 * 9/2021 Samid .............. H04L 9/14
2022/0004647 A1 * 1/2022 Casella .............. G06F 21/64
2022/0109559 A1 * 4/2022 Kalach .............. H04L 9/085
2023/0123475 A1 * 4/2023 Johnson .............. H04L 63/1466 726/2
2023/0216659 A1 * 7/2023 French .............. H04L 9/065 380/28
2023/0336326 A1 * 10/2023 Swahn .............. G09C 1/00
2025/0036787 A1 * 1/2025 Samid .............. H04L 9/3093

FOREIGN PATENT DOCUMENTS

WO 2009013420 A1 1/2009
WO 2019079890 A1 5/2019

OTHER PUBLICATIONS

International Search Report and Written Opinion mailed Feb. 19, 2024 in related/corresponding International Application No. PCT/EP2023/083082.
Office Action created Sep. 26, 2023 in related/corresponding DE Application No. 10 2022 004 632.6.

* cited by examiner

METHOD FOR ENCRYPTING PLAIN TEXT

BACKGROUND AND SUMMARY OF THE INVENTION

Exemplary embodiments of the invention relate to a method for encrypting a piece of plain text to be encrypted containing a plain text message.

Cryptographic functions used for encryption are called ciphers. A cipher, as used in this text, consists of an encryption function and a decryption function. An encryption function maps plain text onto cipher text, while the corresponding decryption function maps cipher text onto plain text. Here, the two functions are naturally injective. Encryption functions often use cryptographic keys. If an encryption function ENCR uses the key K and this is to be displayed explicitly, then this is symbolized in this text by $ENCR_K$ or ENCR_K. Similarly, for a decryption function DECR, $DECR_K$ or DECR K symbolizes that the decryption function uses the key K for decryption.

High-frequency sending and receiving of short messages is of great importance in some applications within a vehicle ecosystem, examples of which can be found, for example, in DE 10 2021 001 095 A1. As depicted in this publication, it is often essential to provide these messages with cryptographic integrity protection and/or cryptographic replay protection without increasing the length of the messages too much, wherein, as depicted in the publication, only symmetrical methods can be considered for this purpose for reasons of efficiency. In some cases, however, it can be important to encrypt the entire message or at least part of it, e.g., the user data, in order to protect confidential user data, for example, and/or to make it more difficult for a potential attacker to read, interpret, and thus reverse engineer the messages and the protocol used.

Similar considerations to those made for integrity and replay protection in DE 10 2021 001 095 A1 also apply to encryption. In principle, short messages in particular could be encrypted asymmetrically, e.g., using RSA-based methods. However, the RSA cipher text of a piece of plain text is at least as long as the key used for encryption, i.e., e.g. 2048 bits when using RSA-2048. Thus, an unencrypted message of e.g., 20 bytes, i.e., 160 bits, becomes an encrypted message at least 2048 bits long to be transmitted, which completely contradicts the need to use short messages. Moreover, asymmetrical decryption requires much more time than symmetrical encryption or decryption. Thus, only symmetrical methods can be used for efficient encryption of short, high-frequency messages.

Today, block ciphers such as AES, for example, are usually used for symmetrical encryption. The block size of a block cipher E is denoted here as $L_E$ or L_E. In raw encryption with a block cipher E of block size $L_E$, a piece of plain text of exactly $L_E$ bits, a so-called plain text block, is encrypted by means of a symmetrical key to form a cipher text of exactly $L_E$ bits, a so-called cipher text block. Correspondingly, in raw decryption with a decryption function D belonging to a block cipher E of block size $L_E$, a cipher text block (exactly $L_E$ bits long) is decrypted to form a plain text block (exactly $L_E$ bits long) by means of a symmetrical key. In both cases, therefore, exactly one complete block is always processed; entries with different lengths are not accepted. E-Raw encryption or D-Raw decryption is referred to here as $E^{RAW}$ or $D^{RAW}$. E-Raw encryption with a symmetrical key K is referred to as $E^{RAW}{}_K$ and D-Raw decryption with a symmetrical key K is referred to as $D^{RAW}{}_K$.

In encryption with a block cipher E, plain text that is longer than $L_E$ bits is divided into blocks corresponding to the cipher block size $L_E$, which are then encrypted individually by means of a symmetrical key. The completely independent encryption of the individual plain text blocks is called ECB mode (a block cipher). In contrast to raw encryption, a cipher operated in ECB mode can handle inputs of any length. If the last plain text block here is shorter than the block size of the block cipher, a so-called padding is used, which fills this last plain text block in a defined way. ECB is the simplest operating mode for a block cipher, but it has the disadvantage that when the same key is used, identical plain text blocks are encrypted to form identical cipher text blocks, whereby an attacker could draw conclusions about the corresponding plain text blocks.

As a remedy for this ECB weakness, more complex operating modes (CBC, CFB, OFB, CTR, etc.) have been developed, in which instead of the independent direct encryption of the individual plain text blocks, as in ECB mode, the encryptions of the individual plain text blocks are more or less closely interwoven, such that in addition to the plain text block itself and the key, the encryption of a next plain text block includes further data generated during the encryption of its predecessor block, usually one block size long, wherein this data included in the encryption of the next clear text block can depend on the predecessor plain text block (CBC, CFB) or can be independent of it (OFB, CTR).

In this way, roughly speaking, identical plain text blocks are generally encrypted to form different cipher text blocks, but this does not apply to the first plain text block, since it has no predecessor block from which it could receive the additional input data. To remedy this, one block size long initialization vectors are generally used, which are used as this additional data when encrypting the first block. Here, an initialization vector may only be used once, i.e., only for one piece of plain text, otherwise the same cipher text blocks are in turn generated for the same plain text blocks (with the same key), an initialization vector must thus be a nonce when the same key is used. Here, an initialization vector only has to be novel, i.e., a nonce, and does not have to be kept secret. Instead, the initialization vector used for encryption is also required for decryption, so the initialization vector must be known to both the sender and the recipient. Since it does not have to be kept secret, it can, for example, also be transmitted as an explicit unencrypted part of the message, which is done with TLS, for example. If this is the case, then it must not be transmitted in encrypted form, as the recipient cannot decrypt the encrypted message without the initialization vector available as a plain text block.

However, the explicit transmission of the initialization vector, in particular as part of short messages, is resource-intensive, since an initialization vector is generally one block long, e.g., 128 bits for AES. When the maximum number of messages that can be encrypted with the same key is known in advance, then the sender can keep a counter that is incremented by one with each new message. This counter can then be used by the sender to generate a new initialization vector, generally one block long, for each new message due to the previous incrementation of the counter, e.g., by means of a suitable padding procedure agreed between the sender and the recipient, by means of which the counter bits are supplemented by further bits or by means of a cryptographic hash function followed by any necessary length adjustment, and used to encrypt the message. Instead of sending the entire initialization vector with each message, only the counter, i.e., the counter bits representing the counter, which represent the number of the respective message, is then sent. Thus, the space required in the message can be reduced from, for example, 128 bits to, for example, 32 bits for a 32-bit long counter.

It would be particularly space-saving to use an implicit split initialization vector by the sender and recipient agreeing on a common start initialization vector and a rule for generating a new type of next initialization vector from the current initialization vector at the beginning and then generating this next new initialization vector synchronously for each new message on both sides by means of the previously agreed rule. The problem here is that messages can get lost or arrive in the wrong order, whereby the synchronization of the initialization vectors carried by the sender and the receiver is lost.

Another equally space-saving way of implicitly synchronizing an initialization vector between sender and recipient would be to derive it from the message itself, which has to be transmitted anyway, in a secure manner, which the sender and recipient could do independently of each other. The problem here is that, on the one hand, the initialization vector must be known to the sender before the encryption process and must therefore be derivable from the plain text message, but on the other hand it must be known to the recipient before the decryption process and must therefore be derivable from the encrypted message, which is a contradictory requirement (at first glance).

So-called synthetic initialization vectors (SIV), which are used in special AEAD methods ("Authenticated Encryption with Associated Data"), i.e., methods that enable both encryption and authentication, are characterized by the fact that they generate the initialization vector used for encryption from the message itself by a unique authentication stamp (tag) being generated from the message, which is then used as an initialization vector when encrypting the message or parts of it. AEAD variants based on synthetic initialization vectors have been developed for various AEAD operating modes, e.g., for a combination of CMAC and CTR (SIV-AES), for AES-GCM (AES-GCM-SIV) or for CCM (CCM-SIV) (see, for example, DE 10 2019 113 026 A1). However, since the initialization vector, i.e., the authentication stamp generated from the unencrypted message, is also required when the message is decrypted, but cannot be derived directly from the encrypted message by the recipient, it must be sent to the recipient unencrypted together with the encrypted message, whereby no space is saved in the message by using a synthetic initialization vector according to the above-mentioned methods.

WO 2009/013420 A1 defines an authentication method similar to CBC-MAC based on block ciphers, which calculates the message authentication code (MAC) via the message extended by a prefix containing the hash value of the message instead of only via the message itself, as is the case with CBC-MAC, for example.

In addition, WO 2019/079 890 A1 discloses a computer-implemented method for a recipient to validate a message received from a sender. The message includes a first part and a second part. The method comprises receiving a token from a certification unit and a key associated with the sender. To validate the message, the method processes and compares the first part of the message together with the token and the second part of the message together with the key.

The generally widespread requirement that a new initialization vector is to be used for the encryption of each new piece of plain text is sufficient, but not absolutely necessary, to eliminate the weakness described above. If it can be ensured that the first block of a piece of plain text is always new, then the requirement to use a new initialization vector can be dispensed with in the operating modes that include the previous block, in particular the previous cipher text block, when concatenating the blocks (e.g., CBC, CFB). In certain cases, it is therefore sufficient for the combination of the initialization vector and the first plain text block to be new for a fixed key. If the first plain text blocks are always new, then the use of an initialization vector can even be dispensed with completely in these specific cases.

If, for example, it is desirable or necessary to do without a guaranteed novel (explicit or implicit) initialization vector for each plain text to be encrypted for reasons of space, then it makes sense to design the format of the plain texts in such a way that the probability of the first block of a plain text always being novel is maximized.

Because the probability of the individual plain texts being "novel", i.e., different in pairs, is greater than the probability of the first blocks of the respective plain texts being novel, i.e., different in pairs, it makes sense, in order to achieve novel first blocks with the greatest possible probability, to collect the "novelty" of the entire plain text in the first block, i.e., to design the first blocks of the respective plain texts in such a way that the first blocks of two different plain texts are also always different.

Depending on the plain text pair, differences between two plain texts can now occur at different positions in the plain texts, so the "novelty" can be distributed over the entire plain text bit positions. Thus, by simply rearranging the respective plain text bits, it is generally not possible to find a plain text format that guarantees the maximum probable novel first plain text blocks. However, the "novelty" contained in the plain texts can be accumulated very well by applying a cryptographic hash function HASH to a sequence of certain selected bits for which there is a possibility that their combination is novel. If there is a difference in at least one of the bits in two-bit sequences BF1 and BF2 belonging to two different plain texts that are used to form the hash value, then the hash values HashTag1:=HASH (BF1) and HashTag2:=HASH (BF2) of the two-bit sequences containing this different bit will also differ with a very high probability.

The hash value HashTag:=HASH (BF) calculated in this way could now be used directly as an initialization vector or an initialization vector could be derived from it, which would always be novel when the plain text bit sequence BF used in the calculation of the hash value were novel. This is how the synthetic initialization vectors (SIV) described above are used, for example. The problem here, as explained above, is that the initialization vector must be known to the recipient so that they can decrypt the fully or partially encrypted plain text. If the initialization vector is not explicitly transmitted unencrypted as part of the plain text, which is undesirable for reasons of space saving, this would mean that no part of the bit sequence BF, which is used to form the hash value HashTag, may be encrypted, since otherwise the recipient cannot derive the initialization vector used by the sender during encryption from the received partially or fully encrypted plain text.

Exemplary embodiments of the present invention are directed to an improved method for encrypting a piece of plain text to be encrypted contained in a plain text message, in which a high level of security can be achieved despite the use of bit sequences derived from the plain text during encryption.

The method according to the invention serves to encrypt ${ENCR^{ZF}}_{ENCR1,ENCR2}{}^{M}$ of a plain text PT to be encrypted contained in a plain text message $M_P$, wherein the plain text message consists of this plain text to be encrypted and an additional or associated data block AD not to be encrypted.

Thus, the following applies: $M_P$=(PT, AD).

This encryption method includes a method for decrypting $DECR^{ZF}{}_{DECR1,DECR2}{}^{M}$ cipher text parts $CT_1$, $CT_2$ contained in a cipher text message $M_C$, wherein the cipher text message consists of these cipher text parts to be decrypted and the non-encrypted associated data block. In both cases, a novelty bit sequence ImpIAD ("Implicit Associated Data") can be included as an additional source of novelty.

According to the invention, a reversible decomposition function ZF is provided, which assigns its decomposition $PT_1$, $PT_2$ to a plain text to be encrypted. In the sense used here, the decomposition is understood to be the result of the application of the decomposition function to the plain text, which provides the plain text parts. Furthermore, at least one encryption function $ENCR_1$, $ENCR_2$ is provided, which is implicitly equipped with suitable fixed key material and which encrypts a plain text to be encrypted with the encryption function by including a variable input bit sequence N, wherein it is assumed that the input bit sequence functions as the first parameter and the plain text to be encrypted as the second parameter. Furthermore, at least one decryption function $DECR_1$, $DECR_2$ belonging to the at least one encryption function is provided, which is implicitly equipped with suitable fixed key material, and which decrypts a cipher text CT generated with the encryption function by including the same variable input bit sequence, wherein it is assumed that the input bit sequence functions as the first parameter and the plain text to be encrypted as the second parameter.

Here, the plain text to be encrypted contained in the plain text message is encrypted using the novelty bit sequence and provides two cipher text parts, wherein the first cipher text part is available by means of the at least one encryption function from the second plain text part, the associated data block and the novelty bit sequence concatenated in any order as a first parameter and the first plain text part as a second parameter. The second cipher text part can be obtained by means of the at least one encryption function from the first cipher text part and the second plain text part as first and second parameters. The decryption associated with the encryption returns the plain text from the cipher text parts contained in the cipher text message by including the novelty bit sequence, wherein the plain text parts can be obtained by means of the decryption from the first cipher text part, the second cipher text part, the associated data block and the novelty bit sequence, wherein the second plain text part can be obtained by means of the at least one encryption function from the cipher text parts as first and second parameters and the first plain text part can be obtained separately from this by means of the at least one decryption function from the second plain text part, the associated data block and the novelty bit sequence, concatenated in the order used in the encryption as first parameter, and the first cipher text part as second parameter.

The method according to the invention is thus based on the idea of using a reversible decomposition function ZF, which allocates two plain text parts $PT_1$, $PT_2$ to each plain text PT to be encrypted. ZF(PT)=($PT_1$, $PT_2$) therefore applies. These plain text parts are then not encrypted in one step, but in two separate steps, e.g., one after the other. Since the decomposition function is reversible, $PT=ZF^{-1}(ZF(PT))$ applies to each plain text to be encrypted, wherein $ZF^{-1}$ denotes the inverse function of the decomposition function. The inverse function can therefore always be used to derive the original plain text from the plain text parts in an unambiguous manner. In the context considered here, the decomposition function does not necessarily have to be defined for all bit sequences; it is sufficient when it is defined for the set of plain texts to be encrypted-usually with the same key. If, for example, only plain texts longer than 20 bytes are to be encrypted, then it is sufficient when the decomposition function is only defined for plain texts longer than 20 bytes.

It is to be noted that because of its reversibility, each decomposition function is novelty-preserving in the sense that for two different plain texts PT and PT' their decompositions ZF(PT)=($PT_1$, $PT_2$) and ZF(PT')=($PT'_1$, $PT'_2$) are also different, i.e., from $PT \neq PT'$, $PT_1 \neq PT'_1$ or $PT_2 \neq PT'_2$ always follows.

If such a decomposition function is present for the set of plain texts to be potentially encrypted, one of the encrypting communication partners involved in the encryption/decryption, e.g., a sender, can encrypt the plain text parts $PT_1$ and $PT_2$ contained in its decomposition ZF(PT) separately, e.g., one after the other, instead of the original plain text PT, and transmit the two resulting cipher text parts $CT_1$, $CT_2$. With the other communication partner, in this case the recipient, the cipher text parts can be decrypted separately after transmission. Once the two cipher text parts have been decrypted, the original plain text can be determined from the two plain text parts obtained by decryption by means of the reverse function of the decomposition function. The following therefore applies: $PT=ZF^{-1}(PT_1, PT_2)$.

The successive encryption of the plain text parts contained in the decomposition instead of the encryption of the complete original plain text in one step has the advantage that the respective plain text parts contained in the decomposition or bit sequences generated from them in a way that preserves novelty, for example the encryptions of the plain text parts, can be used as initialization vectors or for generating initialization vectors when encrypting the respective other plain text part contained in the decomposition.

In particular, selected or all bits of the second plain text part can be used as an initialization vector or to form an initialization vector when encrypting the first plain text part. The encryption of the first plain text part generated in this way can then be used as an initialization vector or to form the initialization vector when encrypting the second plain text part.

The method according to the invention thus makes it possible, in the symmetrical encryption of novel plain texts, to dispense with the use of a conventional initialization vector, which is subject to the problems described at the beginning, without any appreciable loss of security and to encrypt the plain text completely in the process.

Substantially, an encryption function and an allocated decryption function are here sufficient in each case for implementing the invention, but preferably, according to a very advantageous development, it can be provided that two pairs of encryption and decryption functions can be used in each case. These can be assigned to the individual plain text or cipher text parts, for example such that it applies for the plain text parts $PT_1$ to be encrypted that they are encrypted with the first encryption function $ENCR_1$ and the second plain text parts $PT_2$ are encrypted with the second encryption function $ENCR_2$. When decrypting the cipher text parts $CT_1$, $CT_2$, the corresponding first or second decryption function $DECR_1$, $DECR_2$ must be used again.

The encryption $ENCR^{ZF}{}_{ENCR1,ENCR2}{}^{M}$ thus provides the cipher text parts according to:

$$ENCR^{ZF}{}_{ENCR1,ENCR2}{}^{M}(PT, AD, ImpIAD) := CT_1, CT_2), \text{ wherein } CT_1 := ENCR_1(PT_2\|AD\|ImpIAD, PT_1) \text{ and } CT_2 := ENCR_2(CT_1, PT_2),$$

and wherein ($PT_1$, $PT_2$) is the decomposition of the plain text PT with ZF, i.e., ($PT_1$, $PT_2$):=ZF(PT).

The decryption $DECR^{ZF}{}_{DECR1,DECR2}{}^{M}$ belonging to $ENCR^{ZF}{}_{ENCR1,ENCR2}{}^{M}$ of the cipher text pair ($CT_1$, $CT_2$) contained in the cipher text message $M_C$=($CT_1$, $CT_2$, AD) with the inclusion of ImpIAD, i.e., $DECR^{ZF}{}_{DECR1,DECR2}{}^{M}$ ($CT_1$, $CT_2$, AD, ImpIAD), is defined by $$DECR^{ZF}{}_{DECR1,DECR2}{}^{M}(CT_1, CT_2, AD, ImpIAD) := PT, \text{ wherein } PT_2 := DECR_2(CT_1, CT_2), PT_1 := DECR_1(PT_2\|AD\|ImpIAD, CT_1) \text{ and } PT := ZF^{-1}(PT_1, PT_2).$$

A high degree of flexibility for the data to be transmitted emerges from the associated data block not to be encrypted, since encrypted and non-encrypted data parts can be combined. Furthermore, should the probability of novelty of the plain text not be sufficient, this can be increased by using the novelty bit sequence. Nevertheless, in many cases it may also be sufficient to dispense with these parts, such that according to a very advantageous development of the method according to the invention, the associated data block and/or the novelty bit sequence can be specified as empty.

For the purposes of the present invention, a decomposition function is referred to as a conventional decomposition function if a u>0 exists, such that, for all plain texts PT which are longer than u, L($PT_1$)=u and PT=$PT_1$|$PT_2$ always follows from ZF(PT)=($PT_1$, $PT_2$). L(BF) here denotes the bit length of a bit sequence BF. All other decomposition functions are correspondingly called non-conventional.

As described above, depending on the encryption method used, it may be useful to "collect" the novelty contained in the plain text in the first plain text part or in the second plain text part. In the method according to the invention, the decomposition of the plain text is controlled by the decomposition function, wherein non-conventional decomposition functions offer a particular degree of flexibility. According to a very advantageous development of the invention, it can thus be provided to use a non-conventional decomposition function as the decomposition function.

The following examples of decomposition functions are all examples of such non-conventional decomposition functions. For example, a decomposition function could now be chosen in such a way that the first plain text part is formed by the first half of the plain text and the second plain text part by the second half and, if the plain text contains an odd number of bits, the first plain text part is one bit longer than the second plain text part. Another option would be to allocate all even bits of the plain text to the first plain text part and all odd bits of the plain text to the second plain text part. Even if there are rarely useful applications for this in practice, the sum of the lengths of the two plain text parts does not necessarily have to be the same as the length of the plain text. For example, the first plain text part could be formed by the first twenty bytes of the plain text and the second plain text part by the entire plain text.

An encryption function that is implicitly equipped with suitable fixed key material and that encrypts a plain text into a cipher text using a variable input bit sequence is described as preserving novelty in the sense of the invention, if, for each fixed plain text to be encrypted, the use of different variable input bit sequences leads to different cipher texts with a sufficiently high probability for the application, i.e., if, for each plain text to be encrypted, two unequal input bit sequences, i.e. $N_1 \neq N_2$, lead to the result ENCR($N_1$, PT)≠ENCR($N_2$, PT) with a sufficiently high probability for the application. The restriction "with a sufficiently high probability for the application" is made here since the input bit sequence N is not necessarily an initialization vector directly, but rather the required initialization vector may still have to be formed by pseudo-randomization (e.g., by using a cryptographic hash function) and/or length adjustment (both within ENCR). Here, collisions, i.e., the generation of identical initialization vectors from unequal input bit sequences N, cannot be completely ruled out.

In the method described, it is advantageous when the novelty contained in the input bit sequences is not lost during the encryption of the plain text by the encryption functions, but rather is passed on to the respective cipher text as well as possible and as completely as possible. According to a very favorable design of the invention, it is thus provided to use a novelty-preserving encryption function as the at least one encryption function.

In particular, in the case of the two encryption functions, it is particularly important for the first encryption function, since the encryption of the first plain text part by the first encryption function is used as an input bit sequence in the encryption of the second plain text part by the second encryption function.

The decomposition function is thus used to split a plain text into two plain text parts to be encrypted separately. It should be chosen in such a way that the resulting plain text parts match the encryption or decryption methods used, in particular the requirements for the secure application of the encryption functions are met as well as possible, for example by choosing the decomposition function in such a way that the probability of the novelty of the first plain text part is maximized for the messages to be encrypted with the plain text.

According to a very advantageous development of the invention, the decomposition function is defined once and implemented in the encryption and decryption. Thus, a fixed decomposition function that comes closest to the above requirements is agreed between the encrypting entity, e.g., the sender, and the decrypting entity, e.g., the recipient, and then utilized. Here, the decomposition function to be used can be fixed or agreed for the entire lifetime of the systems, but according to an alternative, very advantageous design of the invention, it can also be negotiated between the encrypting entity and the decrypting entity from session to session or for several consecutive sessions as part of a coordination phase preceding the actual operation, a so-called handshake, here a decomposition function should be chosen that appears optimal for securing the messages that are expected to be exchanged for the upcoming session.

A further advantageous alternative can also be to provide an encryption system or a decryption system with a fixed set of decomposition functions supported by this encryption system or this decryption system. In such a case, it is then possible, for example during a handshake between an encrypting and transmitting system and a receiving and decrypting system, to determine which decomposition function available in both systems is subsequently used.

However, it is often the case that it is not known what type of messages are exchanged during a session, i.e., in this case it is difficult to estimate which decomposition function would be most suitable for the respective session. In particular, as needed when encrypting plain text, it may be useful to choose a decomposition function that is particularly suitable for this specific plain text. In order for the decrypting entity to be able to determine which decomposition function was used when encrypting the plain text, this must be communicated to the decrypting entity. This can be done, for example, by labelling the decomposition functions supported by the decrypting entity with sequential numbers known to both the encrypting and decrypting entity and adding the number of the decomposition function used by the encrypting entity to the plain text. Firstly, this extension contradicts the aim of keeping the message to be transmitted as short as possible. However, if only a few decomposition functions are supported, e.g., 16, a few bits, e.g. four in the case of 16 possible decomposition functions, are sufficient in order to encode the number of the decomposition function used during encryption.

It is proposed to add the number of the decomposition function ZF used to all or some plain texts. It is further proposed to agree on a fixed position within the plain text PT, e.g., at its beginning or at its end, and a fixed number of bits used for encoding the number between the encrypting entity and the decrypting entity for all plain texts PT for encoding the number of the decomposition function ZF used.

Moreover, it may be the case that not every plain text PT requires a special decomposition function, but rather that many plain texts PT can also be securely encrypted with a previously agreed default or standard decomposition function ZF. In this case, it may make sense to refrain from transmitting the number of the decomposition function ZF used and instead signal to the encrypting entity that the default decomposition function is to be used to decrypt the plain text. To enable the decrypting entity to be able to determine whether the plain text received contains the number of the decomposition function ZF used or not, the plain text must be extended by this binary information, referred to here as the indicator bit.

In a development of the invention, it is thus proposed to extend each plain text by an indicator bit that indicates whether this plain text has been extended by the number of the decomposition function ZF used or not. Furthermore, it is proposed to agree between the encrypting entity and the decrypting entity for all plain texts a position at which this indicator bit is located in the plain text extended in this way, e.g., to use for this information the first or the last bit of the original plain text extended by this indicator bit.

Since the decomposition function is always applied to plain text, the extensions of the original plain text relating to the decomposition function used, i.e., the indicator bit and/or the number of the decomposition function used, can also be encrypted by the encrypting entity. Here, it must be taken into consideration that the positions of individual bits within the plain text can change when the plain text is decomposed using a decomposition function, in particular when a non-conventional decomposition function is used. If the additional data is to be encrypted, then it may be useful to agree their positions not in relation to the original plain text, but in relation to the two parts of the plain text, so that the decrypting entity can determine the decomposition function to be used before applying it based on the two parts of the plain text.

Here, it is provided, in particular, that the indicator bit contained in the extended plain text and/or the number of the decomposition function used when encrypting contained in the extended plain text is encrypted.

Further advantageous designs and various embodiments of the method according to the invention also emerge from the exemplary embodiments, which are explained in more detail below with reference to the figures.

BRIEF DESCRIPTION OF THE DRAWING FIGURES

Figure 2:
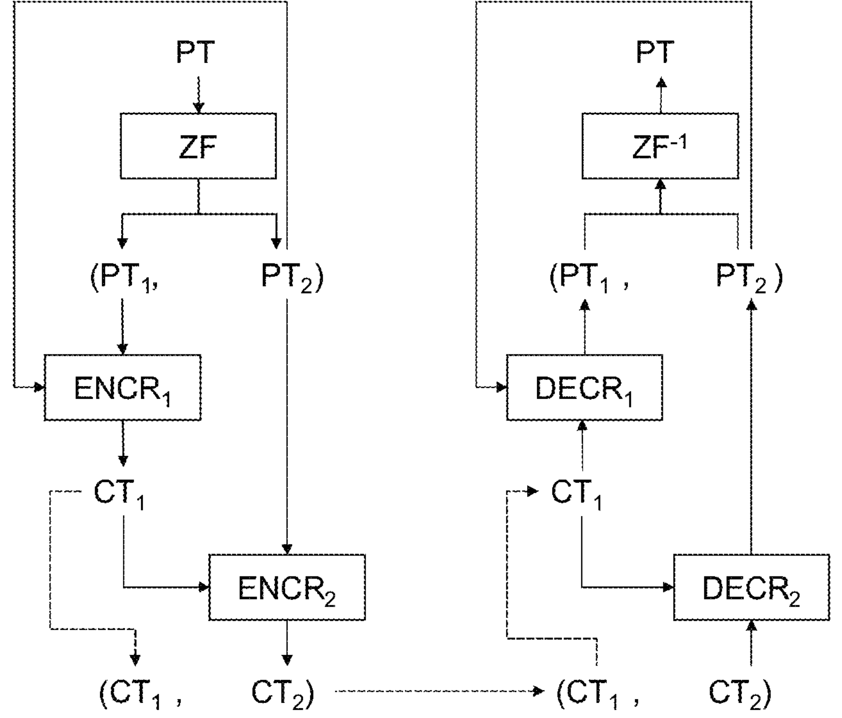

Here are Shown in:

FIG. 1 a schematic depiction of the encryption and decryption in a first embodiment; and FIG. 2 a schematic depiction of the encryption and decryption in a second embodiment.

DETAILED DESCRIPTION

The depiction in FIG. 1 shows a scheme for encrypting and decrypting a piece of plain text PT.

The proposed encryption method $ENCR^{ZF}{}_{ENCR1ENCR2}{}^{M}$ receives a plain text message $M_P$ containing several components and further data as input and encrypts parts of the message $M_P$ by means of the two encryption functions $ENCR_1$ and $ENCR_2$. The following description of the $ENCR^{ZF}{}_{ENCR1,ENCR2}{}^{M}$ encryption method consists of a description of the components that the method uses, a description of the input formats and a description of the actual method, which generates a fully or partially encrypted cipher text message MC from the components of the plain text message $M_P$ using the components.

Components of the Encryption System $ENCR^{ZF}{}_{ENCR1,ENCR2}{}^{M}$:

- a reversible decomposition function ZF
- an encryption function $ENCR_1$ implicitly equipped with suitable fixed key material, which encrypts a plain text PT to be encrypted by including a variable input bit sequence N to $ENCR_1$(N, PT)
- a second encryption function $ENCR_2$ implicitly equipped with suitable fixed key material, which encrypts a plain text PT by including a variable bit sequence N to $ENCR_2$ (N, PT)

Input Formats:

- a message $M_P$ consisting of a plain text PT to be encrypted and an associated data block AD ("Associated Data") of any length, i.e., $M_P$=(PT, AD). The associated data block AD is not encrypted, but it contributes to the formation of the input bit sequence N and thus to increasing the probability of its novelty.
  - If the use of the associated data block AD is to be avoided, then an empty bit sequence can be chosen as the AD.
- An implicit novelty bit sequence ImpIAD ("Implicit Associated Data") of any length, which also contributes to the formation of the input bit sequence N and thus to increasing the probability of its novelty and is known to both the sender and the recipient and is thus not part of the message $M_P$, e.g., a counter known to both sides or the hash value or the encryption of such a counter.
  - If the use of the novelty bit sequence ImpIAD is to be avoided, the empty bit sequence can be chosen as ImpIAD.

If the associated data block AD and the novelty bit sequence ImpIAD are omitted, the method shown schematically in FIG. 2 is obtained, for which the procedure described here otherwise applies analogously.

Encryption $ENCR^{ZF}{}_{ENCR1,ENCR2}{}^{M}$:

Input:
1. $M_P$ = (PT, AD)
2. ImplAD
Determining the output:
1. $(PT_1, PT_2) := ZF(PT)$
2. $CT_1 := ENCR_1 (PT_2 \| AD \| ImplAD, PT_1)$
3. $CT_2 := ENCR_2 (CT_1, PT_2)$
Output
1. $CT_1$, $CT_2$, the following then applies
MC := $(CT_1, CT_2, AD)$ In summary, it is thus proposed to determine the encryption of the plain text PT of a plain text message $M_P$=(PT, AD) consisting of PT, AD as follows:

$$ENCR^{ZF}{}_{ENCR1,ENCR2}{}^{M}(PT, AD, ImplAD) := (CT_1, ENCR_2(CT_1, PT_2)) \text{ where } (PT_1 PT_2) := ZF(PT) \text{ and } CT_1 := ENCR_1(PT_2\|AD\|ImplAD, PT_1)$$

The proposed decryption method $DECR^{ZF}{}_{DECR1,DECR2}{}^{M}$ receives a cipher text message $M_C$ consisting of several partially encrypted components and further data as input and decrypts the encrypted parts of the message $M_C$ by means of the two decryption functions $DECR_1$ and $DECR_2$. The following description of the decryption method $DECR^{ZF}{}_{DECRZFDECR1,DECR2}{}^{M}$ consists of a description of the components that the method uses, a description of the input formats and a description of the actual method, which generates the plain text portion of the original message $M_P$ from the components of the partially encrypted cipher text message $M_C$ using the components.

Components of the Decryption System $DECR^{ZF}{}_{DECR1,DECR2}{}^{M}$:

The inverse function $ZF^{-1}$ of the reversible decomposition function ZF used during encryption The decryption function $DECR_1$ belonging to $ENCR_1$ and implicitly equipped with suitable fixed key material, which decrypts a cipher text CT to $DECR_1$(N, CT) by including a variable input bit sequence N, such that the following applies for all plain texts PT to be encrypted with $ENCR_1$:

$$DECR_1(N, ENCR_1(N, PT)) = PT$$

The decryption function $DECR_2$ belonging to $ENCR_2$ and implicitly equipped with suitable fixed key material, which decrypts a cipher text CT to $DECR_2$ (N, CT) by including a variable input bit sequence N, such that the following applies for all plain texts PT to be encrypted with $ENCR_2$: $DECR_2 (N, ENCR_2 (N, PT))=PT$ Input Formats:

A message $M_C$ consisting of two cipher texts $CT_1$ and $CT_2$ and a non-encrypted associated data block AD, i.e. $M_C=(CT_1, CT_2, AD)$.

ImplAD, as with the encryption Decryption $DECR^{ZF}{}_{DECR1,DECR2}{}^{M}$:

Input:
$M_C = (CT_1, CT_2, AD)$
ImplAD
Determining the output:
$PT_2 := DECR_2 (CT_1, CT_2)$
$PT_1 := DECR_1 (PT_2 \| AD \| ImplAD, CT_1)$ -continued $PT := ZF^{-1} (PT_1, PT_2)$
Output:
PT, $M_P$ := (PT, AD) then applies In summary, it is proposed to determine the decryption of the encrypted cipher text parts $(CT_1, CT_2)$ of a cipher text message consisting of $CT_1$, $CT_2$, AD $M_C=(CT_1, CT_2, AD)$ as follows:

$$DECR^{ZF}{}_{DECR1,DECR2}{}^{M}(CT_1, CT_2, AD, ImplAD) := ZF^{-1}(DECR_1(PT_2\|AD\|ImplAD, CT_1), PT_2) \text{ with } PT_2 := DECR_2(CT_1, CT_2)$$

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for encrypting a plain text to be encrypted contained in a plain text message, wherein the plain text message consists of the plain text to be encrypted and an associated data block not to be encrypted, and an associated method for decrypting first and second cipher text parts contained in a cipher text message, the method comprising:

providing a reversible decomposition function that allocates a decomposition of the reversible decomposition function to the plain text to be encrypted in first and second plain text parts, wherein the cipher text message consists of the first and second cipher text parts and the non-encrypted associated data block, wherein the decrypting of each of the first and second cipher text parts involves an implicit novelty bit sequence serving as an additional source of novelty;

providing at least one encryption function implicitly equipped with first fixed key material, wherein the at least one encryption function encrypts the plain text to be encrypted with the at least one encryption function by including a variable input bit sequence;

providing at least one decryption function, belonging to the at least one encryption function, implicitly equipped with second fixed key material, which decrypts a cipher text generated with the encryption function by including the variable input bit sequence;

encrypting the plain text to be encrypted contained in the plain text message by including the implicit novelty bit sequence and suppling the first and second cipher text parts;

obtaining the first cipher text part using the second plain text part, the associated data block, and the implicit novelty bit sequence, concatenated in any sequence, as a first parameter of the at least one encryption function and the first plain text part as a first second parameter of the at least one encryption function;

obtaining the second cipher text part using the first cipher text part as a second first parameter of the at least one encryption function and the second plain text part as a second parameter of the at least one encryption function;

receiving, by the at least one decryption function, the cipher text message with the implicit novelty bit sequence and the non-encrypted associated data block; and performing the decrypting belonging to the encrypting of the first and second cipher text parts contained in the cipher text message the implicit novelty bit sequence and returning the plain text, wherein the first and second plain text parts are obtained by the decrypting of the first cipher text part, the second cipher text part, the associated data block and the implicit novelty bit sequence, wherein the second plain text part is obtained using the first and second cipher text parts as a first parameter and as a first second parameter of the at least one decryption function, and wherein the first plain text part is decrypted separately from the second plain text part using the second plain text part, the non-encrypted associated data block, and the implicit novelty bit sequence, concatenated in the sequence used in the encrypting, as a second first parameter of the at least one decryption function, and the first cipher text part, as a second parameter of the at least one decryption function, according to which the plain text is obtained from the first and second plain text parts by an inversion of the reversible decomposition function.

2. The method of claim 1, wherein the at least one encryption function includes two encryption functions, which are first and second encryption functions, the at least one decryption function includes two decryption functions, which are first and second decryption functions, the first and the second encryption functions are each implicitly provided with the first fixed key material, which encrypts the plain text to be encrypted with a respective one of the first and second encryption functions by including the variable input bit sequence, the first and the second decryption function belonging to the respective first and second encryption function are implicitly equipped with the second fixed key material, which decrypt the cipher text generated with the respective encryption function by including the variable input bit sequence, the encrypting of the plain text to be encrypted contained in the plain text message is performed by including the implicit novelty bit sequence and providing two cipher text parts, the first cipher text part is obtained using the second plain text part, the associated data block, and the implicit novelty bit sequence, concatenated in any order, as the first parameter of the first encryption function and the first plain text part as the first second parameter of the first encryption function, the second cipher text part is using the first cipher text part as the second first parameter of the second encryption function and the second plain text part, as the second parameter of the second encryption function, the decrypting the cipher text parts contained in the cipher text message is performed using the implicit novelty bit sequence and returns the plain text, the plain text parts are obtained by the first and second decryption functions from the first cipher text part, the second cipher text part, the associated data block, and the implicit novelty bit sequence, the second plain text part is obtained using the first cipher text part as a first parameter of the second decryption function and the second cipher text part as a first second parameter of the second decryption function, the first plain text part is obtained using the second plain text part, the associated data block, and the implicit novelty bit sequence concatenated in the sequence used in the encrypting, as a second first parameter of the first decryption function, and the first cipher text part as a second second parameter of the first decryption function.

3. The method of claim 1, wherein the associated data block or the implicit novelty bit sequence is specified as empty.

4. The method of claim 1, wherein the reversible decomposition function is a non-conventional decomposition function.

5. The method of claim 1, wherein the at least one encryption function is a novelty-preserving encryption function.

6. The method of claim 1, wherein the reversible decomposition function is defined once and implemented in the encrypting and the decrypting.

7. The method of claim 1, wherein the reversible decomposition function for one or more consecutive entities of two communication partners with encryption and decryption is agreed between the communication partners.

8. The method of claim 1, wherein the reversible decomposition function is set as a set of decomposition functions and is implemented in the encrypting and the decrypting.

9. The method of claim 8, wherein individual decomposition functions in the set of decomposition functions are numbered consecutively for identification.

10. The method of claim 9, wherein a number of the at least one decryption function used for encryption and required for decryption is integrated into the plain text to be encrypted.

11. The method of claim 10, wherein the number is arranged at a previously set position within the plain text or within one or both of the first and second plain text parts.

12. The method of claim 10, wherein the plain text is extended by an indication bit, which indicates whether or not the number of the reversible decomposition function is contained in the plain text or one of the first and second plain text parts.

13. The method of claim 12, wherein the indication bit is arranged at a previously defined position within the plain text or within one or both first and second plain text parts.

14. The method of claim 10, wherein the method uses a standard decomposition function if the number does not exist.

* * * * *